United States Patent
Jomori et al.

(10) Patent No.: US 8,438,922 B2
(45) Date of Patent: May 14, 2013

(54) OSCILLATION ANGULAR VELOCITY SENSOR

(75) Inventors: Tomoya Jomori, Kariya (JP); Minekazu Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 327 days.

(21) Appl. No.: 12/923,123

(22) Filed: Sep. 2, 2010

(65) Prior Publication Data

US 2011/0056292 A1    Mar. 10, 2011

(30) Foreign Application Priority Data

Sep. 4, 2009   (JP) ................................. 2009-204751

(51) Int. Cl.
  *G01C 19/56*   (2006.01)
(52) U.S. Cl.
  USPC ..................................... 73/504.12; 73/504.14
(58) Field of Classification Search ............... 73/504.12, 73/504.14, 504.16, 504.02, 504.04
  See application file for complete search history.

(56) References Cited

U.S. PATENT DOCUMENTS

| | | | | |
|---|---|---|---|---|
| 7,481,110 B2* | 1/2009 | Handrich et al. | .......... | 73/504.12 |
| 8,210,038 B2* | 7/2012 | Rocznik | ...................... | 73/504.12 |
| 8,225,660 B2* | 7/2012 | Sakai et al. | ................. | 73/504.12 |
| 8,234,920 B2* | 8/2012 | Higuchi et al. | ............ | 73/504.12 |
| 2003/0131664 A1 | 7/2003 | Mochida et al. | | |
| 2003/0154788 A1* | 8/2003 | Willig et al. | ............... | 73/504.02 |
| 2003/0164040 A1 | 9/2003 | Willig et al. | | |
| 2004/0206176 A1 | 10/2004 | Willig et al. | | |
| 2007/0144254 A1* | 6/2007 | Handrich | .................... | 73/504.12 |
| 2010/0116050 A1* | 5/2010 | Wolfram | ..................... | 73/504.12 |
| 2010/0139399 A1* | 6/2010 | Geiger et al. | ............. | 73/504.12 |

FOREIGN PATENT DOCUMENTS

JP   A-2006-266784   10/2006

OTHER PUBLICATIONS

Office Action mailed Jan. 10, 2012 in corresponding JP Application No. 2009-204751 (and English translation).

* cited by examiner

*Primary Examiner* — Helen C. Kwok

(74) *Attorney, Agent, or Firm* — Posz Law Group, PLC

(57) ABSTRACT

Each of first and second oscillators includes a detector portion and a driver portion. The detector portion includes a stationary detector electrode and a detector weight, which includes a movable detector electrode opposed to the stationary detector electrode. The driver portion includes a driver weight having a movable driver electrode, which oscillates the detector portion, and a stationary driver electrode opposed to the movable driver electrode. The driver weights of the first and second oscillators are directly connected through a driver joint beam. The detector weights of the first and second oscillators are directly connected through a detector joint beam.

16 Claims, 9 Drawing Sheets

OSCILLATION ANGULAR VELOCITY SENSOR

CROSS REFERENCE TO RELATED APPLICATIONS

This application is based on and incorporates herein by reference Japanese Patent Application No. 2009-204751 filed on Sep. 4, 2009.

FIELD OF THE INVENTION

The present invention relates to an oscillation angular velocity sensor.

BACKGROUND OF THE INVENTION

For example, JP-A-2005-514609 and JP-A-2004-163376 propose conventional sensors for detecting a rotation (angular velocity) of an object. Specifically, JP-A-2005-514609 (US 2004/0206176A1) proposes a rotation angle sensor including two structural members each having a Coriolis element (weight) located around a detector element (detector weight). Coriolis elements are directly connected with each other via a spring. Each Coriolis element is connected with a corresponding driver weight. JP-A-2004-163376 (US 2003/0206176A1) proposes an angular velocity sensor including two structural members each having outer mass portions (driver weights) located around a center mass portion (detector weight). Each outer mass portion is directly connected with an outer support beam. In the present structure, when the sensor receives impact from its outside, Coriolis elements, which are directly connected via springs, and the outer mass portions, which are directly connected with the outer support beam, synchronously move in the direction of the impact. Therefore, a component of the impact can be offset and removed from a component of a detected angular velocity.

In JP-A-2005-514609 and JP-A-2004-163376, the Coriolis elements, which function to cause a driving power, are directly connected via the spring, and the outer mass portions, which function to cause a driving power, are directly connected with the outer support beam. It is noted that the detector elements are not connected with each other, and the center mass portions are not connected with each other. In the present structures, synchronism between the Coriolis elements and synchronism between the outer mass portions can be enhanced with respect to an impact. Nevertheless, synchronism between the detector elements and synchronism between the center mass portions may be spoiled.

Decrease in the synchronism between the detector element or decrease in the synchronism between the center mass portions may result in decrease in the effect to offset the component of the impact from the component of the detected angular velocity.

SUMMARY OF THE INVENTION

In view of the foregoing and other problems, it is an object of the present invention to produce an oscillation angular velocity sensor including two oscillators each having a driver weight and a detector weight, the oscillation angular velocity sensor having enhanced synchronism between driver weights and enhanced synchronism between detector weights with respect to an external impact.

According to one aspect of the present invention, an oscillation angular velocity sensor comprises a first oscillator and a second oscillator. Each of the first oscillator and the second oscillator includes a detector portion formed in one surface of a substrate, the detector portion including a stationary detector electrode, which is supported by the substrate, and a detector weight, which includes a movable detector electrode opposed to the stationary detector electrode and movable relative to the stationary detector electrode. Each of the first oscillator and the second oscillator further includes a driver portion formed in the one surface of the substrate, the driver portion including a driver weight, which includes a movable driver electrode configured to oscillate the detector portion in a driving direction perpendicular to a moving direction of the movable detector electrode, and a stationary driver electrode opposed to the movable driver electrode. The oscillation angular velocity sensor is configured to, when an angular velocity occurs while the detector portion is oscillated, detect the angular velocity according to a variation in an electric capacitance, the variation being caused by change in a distance between the stationary detector electrode and the movable detector electrode moved by a Coriolis force applied to the detector portion. The driver weight of the first oscillator and the driver weight of the second oscillator are directly connected through a driver joint beam. The detector weight of the first oscillator and the detector weight of the second oscillator are directly connected through a detector joint beam.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

First, problems of prior arts proposed in JP-A-2005-514609 and JP-A-2004-163376 will be described with reference to FIGS. 11, 12.

Figure 11:
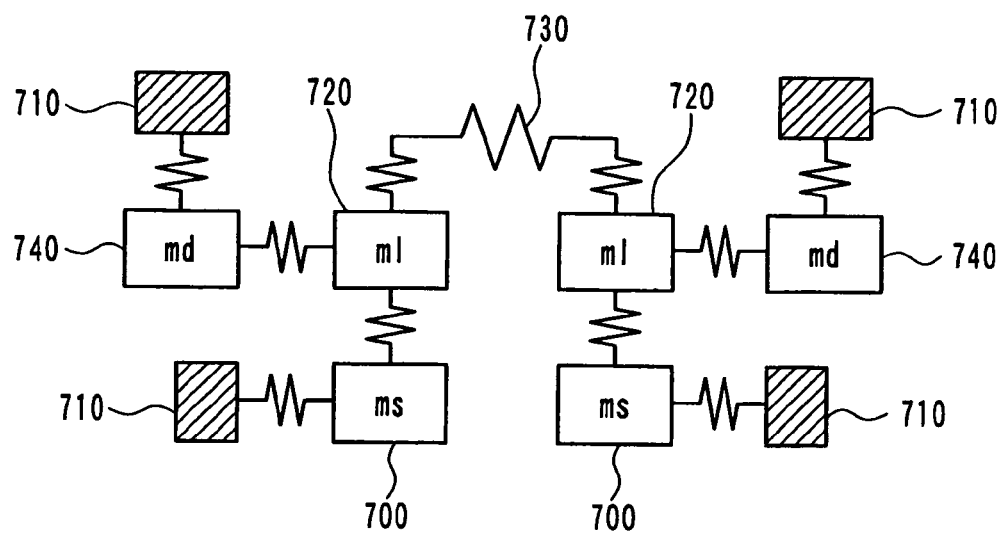
FIG. 11 is a schematic view showing a structural model of a rotation angle sensor according to a prior art.

FIG. 11 is a schematic view showing a structural model of the rotation angle sensor proposed in JP-A-2005-514609. As depicted in FIG. 11, each detector element 700 (ms) is supported by a corresponding stationary portion 710 and connected with a corresponding Coriolis element 720 (ml). The Coriolis elements 720 are directly connected with each other via a spring 730. Each Coriolis element 720 is supported by the corresponding stationary portion 710 via a corresponding driver weight 740 (md).

In the present structure, the Coriolis elements 720 are directly connected with each other via the spring 730. Thereby, a synchronism between the Coriolis element 720 can be enhanced. On the other hand, the detector elements 700 are indirectly connected with each other via the Coriolis elements 720 and the spring 730. Therefore, each detector element 700 is exerted with an influence of motions of the Coriolis element 720 and the spring 730. Consequently, synchronism between the detector elements 700 is spoiled.

Figure 12:
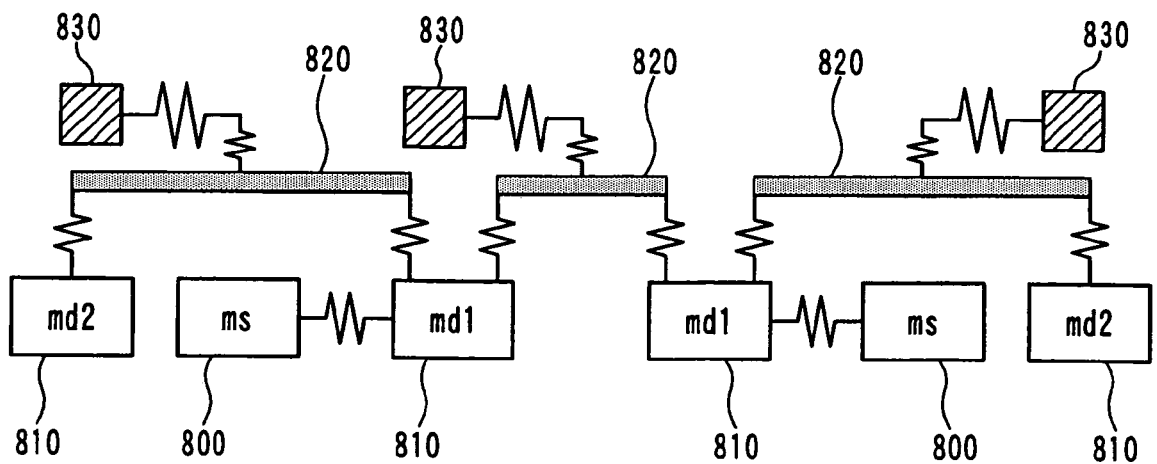
FIG. 12 is a schematic view showing a structural model of an angular velocity sensor according to a prior art.

FIG. 12 is a schematic view showing a structural model of the angular velocity sensor proposed in JP-A-2004-163376. As depicted in FIG. 12, each center mass portion 800 (ms) is connected to a corresponding outer mass portion 810 (md1). The outer mass portions 810 (md1, md2) are connected with each other via a corresponding outer support beam 820. Each outer support beam 820 is supported by a corresponding stationary portion 830.

In this structure, each outer mass portion 810 is directly connected with the outer support beam 820. Thereby, synchronism between the outer mass portions 810 can be enhanced. On the other hand, the center mass portions 800 are indirectly connected with each other via the outer mass portions 810 and the outer support beam 820. Therefore, each center mass portion 800 is exerted with an influence of motions of the outer mass portion 810 and the outer support beam 820. Consequently, synchronism between the center mass portions 800 is spoiled.

As described above, decrease in the synchronism between the detector elements 700 or decrease in the synchronism between the center mass portions 800 when an impact is applied to the sensors may result in decrease in the effect to offset the component of the impact from the component of the detected angular velocity.

In view of the foregoing, embodiments of the present invention will be described with reference to drawings.

First Embodiment

As follows, the first embodiment will be described with reference to drawings. In the present example, an oscillation angular velocity sensor in the following description is for detecting an angular velocity as a physical quantity. For example, the oscillation angular velocity sensor is used for detecting an angular velocity of a vehicle. Application of the oscillation angular velocity sensor is not limited to a vehicle.

Figure 1:
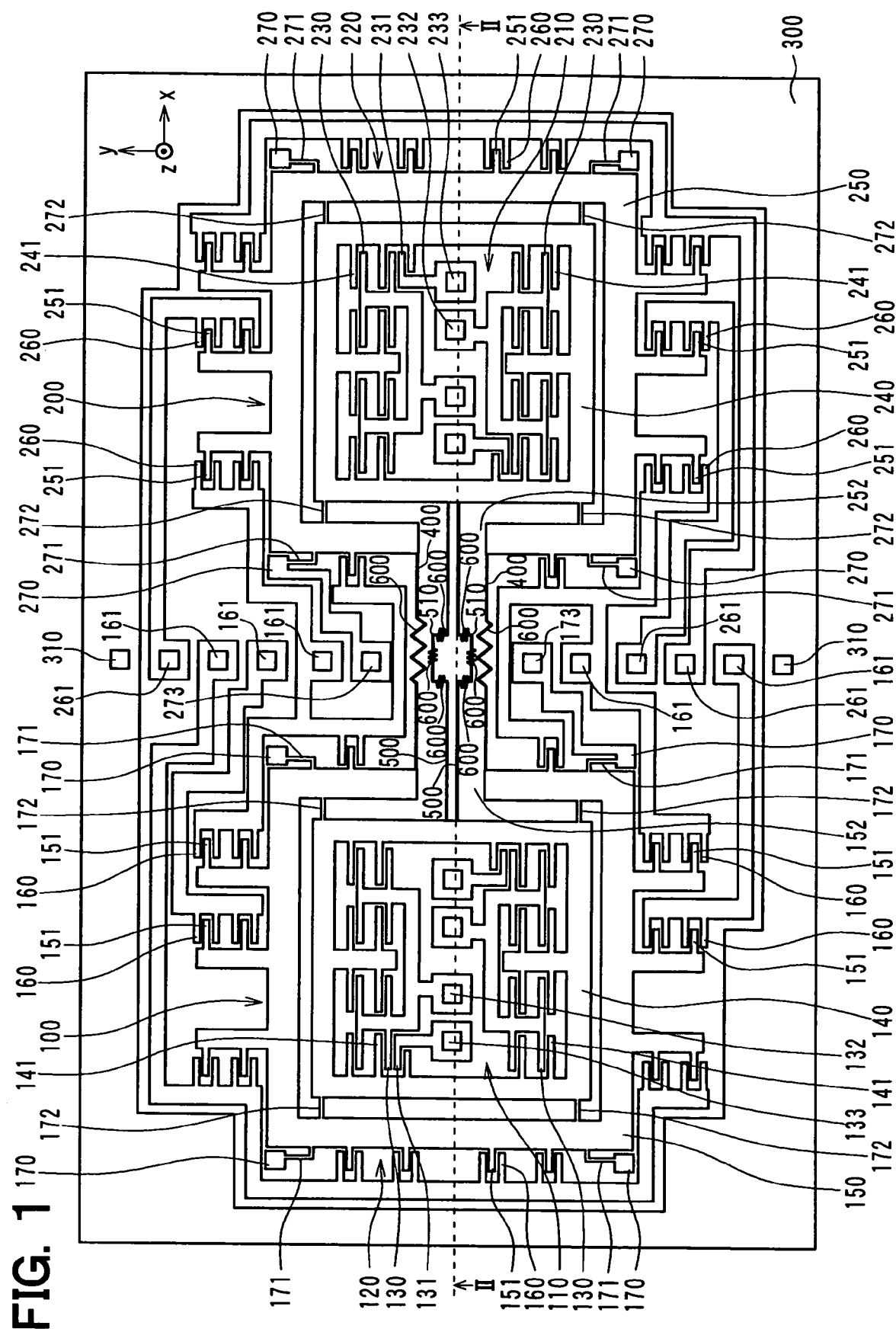
FIG. 1 is a top view showing an oscillation angular velocity sensor according to a first embodiment of the present invention.
Figure 2:
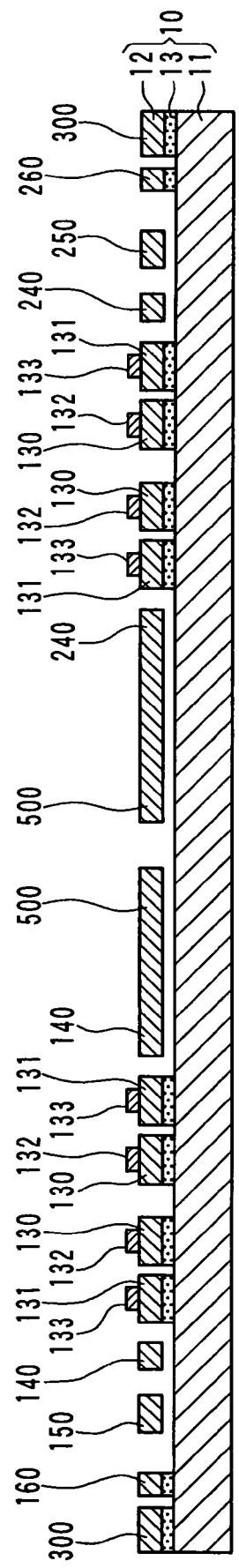
FIG. 2 is a sectional view taken along the line II-II in FIG. 1.

FIG. 1 is a top view showing an oscillation angular velocity sensor according to the present embodiment. FIG. 2 is a sectional view taken along the line II-II in FIG. 1. As follows, the oscillation angular velocity sensor will be described with reference to FIG. 1 and FIG. 2.

As shown in FIG. 2, the oscillation angular velocity sensor is formed on one side of a plate-shaped substrate 10. The substrate 10 is a silicon-on-insulator (SOI) board having a structure in which a sacrifice layer 13 is interposed between a supporting board 11 and a semiconductor layer 12. In the laminated structure, the surface of the semiconductor layer 12 on the opposite side of the sacrifice layer 13 is equivalent to one side of the substrate 10.

In the present embodiment, a direction arbitrary specified in the plane of the one side of the semiconductor layer 12 is an x-axis direction, a direction perpendicular to the x-axis direction is a y-axis direction, and a direction perpendicular to the one side of the semiconductor layer 12 is a z-axis direction.

The material of the supporting board 11 is, for example, single crystal silicon. The material of the semiconductor layer 12 is, for example, polysilicon. The material of the sacrifice layer 13 is, for example, silicon oxide (SiO2). The thickness of the supporting board 11 is, for example, between 450 micrometers and 600 micrometers. The thickness of the sacrifice layer 13 is, for example, several micrometers. The thickness of the semiconductor layer 12 is, for example, 25 micrometers.

Two oscillators including a first oscillator 100 and a second oscillator 200 are formed in the semiconductor layer 12. Specifically, detector portions 110, 210, driver portions 120, 220, and a peripheral portion 300 are formed in the semiconductor layer 12. The first oscillator 100 is configured of the detector portion 110 and the driver portion 120. The second oscillator 200 is configured of the detector portion 210 and the driver portion 220.

As follows, the structure of the oscillators 100, 200 will be described. The oscillators 100, 200 have equivalent structures. Therefore, the structure of the oscillators 100, 200 will be described together.

Each of the detector portions 110, 210 is for detecting a Coriolis force caused correspondingly to an angular velocity of the sensor. The detector portions 110, 210 respectively include stationary detector electrodes 130, 230, servo electrodes 131, 231, and rectangular frame shaped detector weights 140, 240.

The stationary detector electrodes 130, 230 and the servo electrodes 131, 231 are electrodes fixed to the supporting board 11 through the sacrifice layer 13. The stationary detector electrodes 130, 230 and the servo electrodes 131, 231 are located inside of the detector weights 140, 240. The stationary detector electrodes 130, 230 are electrodes for detecting a capacitance. The servo electrodes 131, 231 are electrodes for controlling motions of the detector weights 140, 240 when detecting the capacitance.

Detector pads 132, 232 and servo pads 133, 233 are respectively formed on the upper portions of the stationary detector electrodes 130, 230 and the servo electrodes 131, 231. Bonding wires or the like are connected to the detector pads 132, 232 and the servo pads 133, 233. In the present structure, transmission of an electric potential of the of the stationary detector electrodes 130, 230 to an external device is enabled. In addition, application of a voltage, which corresponds to a servo force, from an external device to the servo electrodes 131, 231 is enabled.

The detector weights 140, 240 function as weights movable correspondingly to a Coriolis force caused by an angular velocity applied to the oscillation angular velocity sensor. The detector weights 140, 240 are respectively opposed to the stationary detector electrodes 130, 230. The detector weights 140, 240 respectively include movable detector electrodes 141, 241 movable with respect to the stationary detector electrodes 130, 230.

The movable detector electrodes 141, 241 are respectively extended to the inside of the detector weights 140, 240. Each of the movable detector electrodes 141, 241 is in a comb-teeth shape and movable in the y-axis direction. In this way, the movable detector electrodes 141, 241 and the stationary detector electrodes 130, 230 are located in the comb-teeth shape to form comb-teeth electrodes configured to function as a capacitor (condenser).

The driver portions 120, 220 oscillate the detector portions 110, 210 in a driving direction (x-axis direction), which is perpendicular to a movable direction (y-axis direction) of the movable detector electrodes 141, 241. The driver portions 120, 220 are located around the detector portions 110, 210.

The driver portions 120, 220 respectively include rectangular frame shaped driver weights 150, 250, stationary driver electrodes 160, 260, stationary portions 170, 270, driver beams 171, 271, and support beams 172, 272.

The driver weights 150, 250 respectively support the detector portions 110, 210 via the support beams 172, 272 to float the detector portions 110, 210 relative to the supporting board 11. In addition, the driver weights 150, 250 function as weights to enable the detector portions 110, 210 to oscillate in the driving direction (x-axis direction). Specifically, the driver weights 150, 250 oscillate in the x-axis direction to oscillate the detector weights 140, 240 in the x-axis direction.

The driver weights 150, 250 are respectively located around the detector weights 140, 240. That is, the detector weights 140, 240 are respectively located inside of the rectangular frame shaped driver weights 150, 250.

The driver weights 150, 250 respectively include movable driver electrodes 151, 251. The movable driver electrodes 151, 251 respectively oscillate the detector portions 110, 210 in the driving direction, which is perpendicular to the movable direction of the movable detector electrodes 141, 241. Each of the movable driver electrodes 151, 251 includes multiple elements provided on the outer periphery of the driver weights 150, 250 to be in a shape of comb-teeth. In the present embodiment, each of the movable driver electrodes 151, 251 is in parallel with the x-axis in order to oscillate the detector portions 110, 210 in the x-axis direction.

The stationary driver electrodes 160, 260 are electrodes fixed to the supporting board 11 through the sacrifice layer 13. The stationary driver electrodes 160, 260 are respectively located around the driver weights 150, 250. The stationary driver electrodes 160, 260 are respectively opposed to the movable driver electrodes 151, 251. Each of the stationary driver electrodes 160, 260 is in parallel with the x-axis. The stationary driver electrodes 160, 260 are partially commonly used by the oscillators 100, 200.

The stationary portions 170, 270 are fixed to the supporting board 11 through the sacrifice layer 13. In the present embodiment, four stationary portions 170, 270 are respectively provided around the driver weights 150, 250.

The driver beams 171, 271 respectively connect the driver weights 150, 250 with the stationary portions 170, 270. Each of the driver beams 171, 271 has resilience.

The support beams 172, 272 respectively connect the driver weights 150, 250 with the detector weights 140, 240, which are respectively located inside of the driver weights 150, 250. Each of the support beams 172, 272 has resilience. In the present embodiment, four support beams 172, 272 respectively connect the detector weights 140, 240 with the driver weights 150, 250.

In the present structure, the stationary portions 170, 270, the driver beams 171, 271, and the support beams 172, 272 integrally connect the detector weights 140, 240 with the driver weights 150, 250 to support the detector weights 140, 240 and the driver weights 150, 250. Thus, as shown in FIG. 2, the detector weights 140, 240 and the driver weights 150, 250 are floated on the supporting board 11 to be at a constant distance relative to the supporting board 11. The movable detector electrodes 141, 241, which are formed in the detector weights 140, 240, and the movable driver electrodes 151, 251, which are formed in the driver weights 150, 250, are also floated at a constant distance relative to the supporting board 11.

Each of stationary pads 173, 273 is formed on a top portion of corresponding one of the stationary portions 170, 270 extended to a portion between the oscillators 100, 200. Bonding wires or the like are respectively connected to the stationary pads 173, 273 to enable application of a predetermined voltage respectively to the movable driver electrodes 151, 251 respectively through the stationary portions 170, 270, the driver beams 171, 271, and the driver weights 150, 250 from an external device.

The stationary driver electrodes 160, 260 are respectively located around the driver weights 150, 250. Each of driver pads 161, 261 is formed on a top portion of corresponding one of the stationary driver electrodes 160, 260 extended to a portion between the oscillators 100, 200. Bonding wires or the like are respectively connected to the driver pads 161, 261 to enable transmission of an electric potential of the stationary driver electrodes 160, 260 to an external device. The driver pads 161 are respectively provided to the stationary driver electrodes 160, 260, which are commonly used by the oscillators 100, 200.

The peripheral portion 300 is located around the oscillators 100, 200. In the present embodiment, the peripheral portion 300 is formed to surround both the first oscillator 100 and the second oscillator 200 all together. Peripheral pads 310 are formed in the peripheral portion 300. Bonding wires or the like are connected to the peripheral pad 310 to enable application of a predetermined voltage to the peripheral portion 300.

Thus, the structure of each of the oscillators 100, 200 has been described. In the oscillators 100, 200, a driver joint beam 400 directly connects the driver weight 150 of the first oscillator 100 with the driver weight 250 of the second oscillator 200, and a detector joint beam 500 directly connects the detector weight 140 of the first oscillator 100 with the detector weight 240 of the second oscillator 200. As follow, the joint structure in the oscillators 100, 200 will be described.

As described above, each of the driver weights 150, 250 is in a rectangular frame shape. Referring to FIG. 1, the driver weight 150 has an opening 152 in a portion opposed to the driver weight 250, and the driver weight 250 has an opening 252 in a portion opposed to the driver weight 150.

The driver joint beam 400 connects one of opening ends of the opening 152 with one of opening ends of the opening 252. The driver joint beam 400 connects the other of the opening ends of the opening 152 with the other of the opening ends of the opening 252. In this way, the two driver joint beams 400 directly connect the driver weight 150 with the driver weight 250.

The detector weights 140, 240 are respectively located inside of the driver weights 150, 250. The openings 152, 252 are respectively formed in the driver weights 150, 250. In the present structure, the detector weights 140, 240 are opposed to each other through the openings 152, 252. The present structure enables the detector joint beam 500 to connect the detector weights 140, 240 with each other.

In the present embodiment, the two detector joint beams 500 directly connect the detector weights 140, 240 with each other through the openings 152, 252 of the driver weights 150, 250. In this way, the driver weights 150, 250 are respectively located outside of the detector weights 140, 240 to form an outer-driver-inner-detector structure. In such an outer-driver-inner-detector structure, the detector weights 140, 240 are respectively surrounded by the driver weights 150, 250. Therefore, the openings 152, 252 respectively provided in the driver weights 150, 250 enable the detector joint beams 500 to directly connect the detector weights 140, 240 with each other.

The driver joint beams 400 are respectively connected to the opening ends of the openings 152, 252 of the driver weights 150, 250. The detector joint beams 500 are located inside of the openings 152, 252 of the driver weights 150, 250. In the present structure, the detector joint beams 500 are interposed between the driver joint beams 400.

In addition, referring to FIG. 1, each of the detector joint beam 500 has a detector joint portion 510, which is a bent portion of the detector joint beam 500. The detector joint portion 510 includes a portion extended in a direction (y-axis direction in the present embodiment), which is different from an extended direction (x-axis direction) of the detector joint beam 500.

In the extended direction of the detector joint beam 500, the detector joint beam 500 is extended. That is, the extended direction of the detector joint beam 500 is in parallel with both a direction, in which the oscillators 100, 200 are arranged, and the longitudinal direction of the detector joint beam 500. In an extended direction of the driver joint beam, 400, the driver joint beam 400 is extended. The extended direction of the driver joint beam 400 is in parallel with both the direction, in which the oscillators 100, 200 are arranged, and the longitudinal direction of the driver joint beam 400.

The detector joint portion 510 is in a U-shape (horseshoe-shape). Specifically, a part of the detector joint beam 500 is bent to be perpendicular to the extended direction of the detector joint beam 500 to form the detector joint portion 510. More specifically, the detector joint portion 510 includes a branch portion, which is linearly extended in the driving direction (x-axis direction) of the driver weights 150, 250, and a branch portion, which is linearly extended in the movable direction (y-axis direction) of the detector weights 140, 240, which receive a Coriolis force.

As described above, the thickness of the semiconductor layer 12 is, for example, 25 micrometers. Therefore, the thickness of the driver joint beam 400 and the detector joint beam 500 is, for example, 25 micrometers. The width of the driver joint beam 400 and the detector joint beam 500 is, for example, 5 micrometers.

The driver joint beam 400 includes a spring portion 600. Specifically, a part of the driver joint beam 400 forms the spring portion 600 to expand and contract in the extended direction of the driver joint beam 400. Similarly, the detector joint beam 500 includes spring portions 600. Specifically, the detector joint portion 510 of the detector joint beam 500 partially forms the spring portions 600. The spring portions 600 expand and contract so that the detector weight 140 of the first oscillator 100 and the detector weight 240 of the second oscillator 200 move in both the extended direction of the detector joint beam 500 and the direction perpendicular to the extended direction of the detector joint beam 500. Each of the driver joint beam 400 and the detector joint beam 500 (detector joint portion 510) is bent to be in a wave shape to form the spring portion 600.

One of the driver joint beams 400 is provided with corresponding one spring portion 600. One of the detector joint beams 500 includes corresponding one horseshoe-shaped detector joint portion 510 having branch portions each provided with one spring portion 600. That is, one of the detector joint beams 500 is provided with three spring portions 600.

Figure 3:
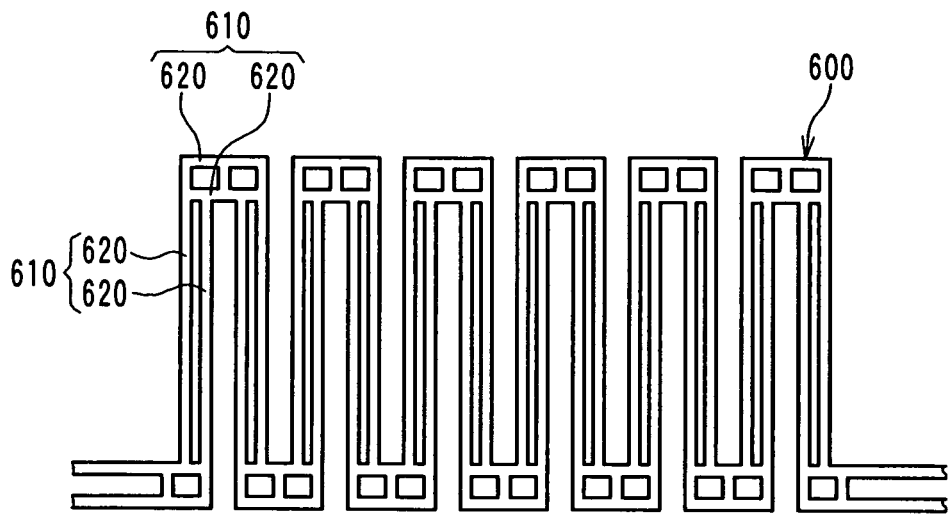
FIG. 3 is a top view showing a stress relief portion of the oscillation angular velocity sensor.

FIG. 3 is a top view showing one of the spring portions 600. As shown in FIG. 3, the spring portion 600 is entirely in a wavelike zigzag shape. Two rod portions 620 are located in parallel to form one of linear portions 610 being in a zigzag shape. The linear portions 610 are repeatedly connected to be in a wave shape to form the spring portion 600.

In the present structure of the spring portion 600, each rod portion 620 of the linear portion 610 of the spring portion 600 does not expand and contract in the extended direction (longitudinal direction) of the rod portion 620. Therefore, the spring portion 600 expands and contracts in the direction in which the combination of linear portions 610 in a U-shape are repeatedly arranged to be in a zigzag form. Thus, the driver joint beam 400 expands and contracts at the spring portion 600 in the extended direction of the driver joint beam 400 (x-axis direction).

In the detector joint beam 500, the spring portion 600 is provided in each branch portion of the detector joint portion 510. Therefore, the detector joint beam 500 expands and contracts in the extended direction of each branch portion (longitudinal direction). Thus, the detector joint beam 500 is configured to expand and contract in both the x-axis direction and the y-axis direction. The above is the entire structure of the oscillation angular velocity sensor according to the present embodiment.

Next, an explanation will be given of a method for fabricating the oscillation angular velocity sensor. First, the substrate 10 is prepared. The substrate 10 includes the sacrifice layer 13 formed on the supporting board 11 and the semiconductor layer 12 formed on the sacrifice layer 13. A metal film such as aluminum is formed on the semiconductor layer 12. The stationary pads 173, 273, the driver pads 161, 261, and the peripheral pad 310 are formed on the metal film through a photolithography etching process.

Subsequently, patterns of the detector portions 110, 210, the driver portions 120, 220, the peripheral portion 300, the driver joint beam 400, and the detector joint beam 500 are formed in the semiconductor layer 12 through a photolithography etching process. In the present photolithography etching process, the semiconductor layer 12 is patterned so that the detector joint portions 510 are formed in the detector joint beam 500, and the spring portions 600 are formed in the driver joint beams 400 and the detector joint portions 510 of the detector joint beams 500.

The sacrifice layer 13 under the pattern formed in the semiconductor layer 12 is removed using an etching medium such as hydrogen fluoride (HF) in a gaseous phase or a liquid phase. Specifically, the sacrifice layer 13 under the movable detector electrodes 141, 241, the detector weights 140, 240, the movable driver electrodes 151, 251, the driver weights 150, 250, the support beams 172, 272, the driver beams 171, 271, the driver joint beam 400, and the detector joint beam 500 is removed using the etching medium. Through the present process, the movable detector electrodes 141, 241, the detector weights 140, 240, the movable driver electrodes 151, 251, the driver weights 150, 250, the support beams 172, 272, the driver beams 171, 271, the driver joint beam 400, and the detector joint beam 500 are released (floated) from the supporting board 11. In this way, the oscillation angular velocity sensor is fabricated.

In the above description, a manufacturing method of a single element of the oscillation angular velocity sensor has been explained. In reality, multiple sensors are formed on one silicon wafer through the above-described processes, and the silicon wafer is subject to dicing (slicing) to be divided into multiple sensors.

As follows, a method for detecting an angular velocity using the oscillation angular velocity sensor manufactured through the above-described processes will be described. When an angular velocity occurs during the driver portions 120, 220 drives the detector portions 110, 210 to oscillate the detector portions 110, 210, the detector weights 140, 240 and the movable detector electrodes 141, 241 are applied with a Coriolis force. The Coriolis force causes the stationary detector electrodes 130, 230 and the movable detector electrodes 141, 241 to change the distance therebetween. Thus, the oscillation angular velocity sensor detects an angular velocity according to a variation in an electric capacity between the electrodes.

Specifically, when an electric potential difference is caused between the stationary driver electrodes 160, 260 and the movable driver electrodes 151, 251, the driver weights 150, 250 are moved in the x-axis direction. Therefore, when an alternating voltage at a certain frequency is applied to the stationary driver electrodes 160, 260, the driver weights 150, 250 are oscillated at the certain frequency. The certain frequency is a desired oscillation frequency of the driver weights 150, 250, and may be a natural oscillation frequency of the oscillators 100, 200, in general.

In the present condition, the driver weights 150, 250 respectively drive the detector weights 140, 240 in the driving direction (x-axis direction) so that the detector weight 140 of the first oscillator 100 and the detector weight 240 of the second oscillator 200 are in opposite phases (180 degrees of phase difference). In this, way, the detector weights 140, 240 oscillate in the x-axis direction similarly to the driver weights 150, 250.

In the condition where the detector weights 140, 240 oscillate in the x-axis direction in this way, when an angular velocity around the z-axis, which is perpendicular to the x-axis and the y-axis, is applied, a Coriolis force occurs in the y-axis direction. The Coriolis force moves the detector weights 140, 240 in the y-axis direction relative to the driver weights 150, 250. The detector weights 140, 240 oscillate in the phase opposite to each other. Therefore, the Coriolis force moves the movable detector electrodes 141, 241 in the opposite directions when an angular velocity around the z-axis, which is perpendicular to the plane of the substrate 10, is applied.

The movement of the detector weights 140, 240 can be measured by detecting a variation in the capacitance caused by change in the distance between the movable detector electrodes 141, 241 and the stationary detector electrodes 130, 230. The variation in the capacity between the movable detector electrodes 141, 241 and the stationary detector electrodes 130, 230 is detected, and a voltage corresponding to a servo force is applied to the servo electrodes 131, 231 so as to suppress the variation in the capacity. Thus, the angular velocity is measured according to the voltage corresponding to the servo force.

As described above, when an impact is applied from an external object to the sensor, which detects an angular velocity, the driver weights 150, 250 moves in combination, and the detector weights 140, 240 moves in combination. The present operation will be described with reference to FIG. 4.

Figure 4:
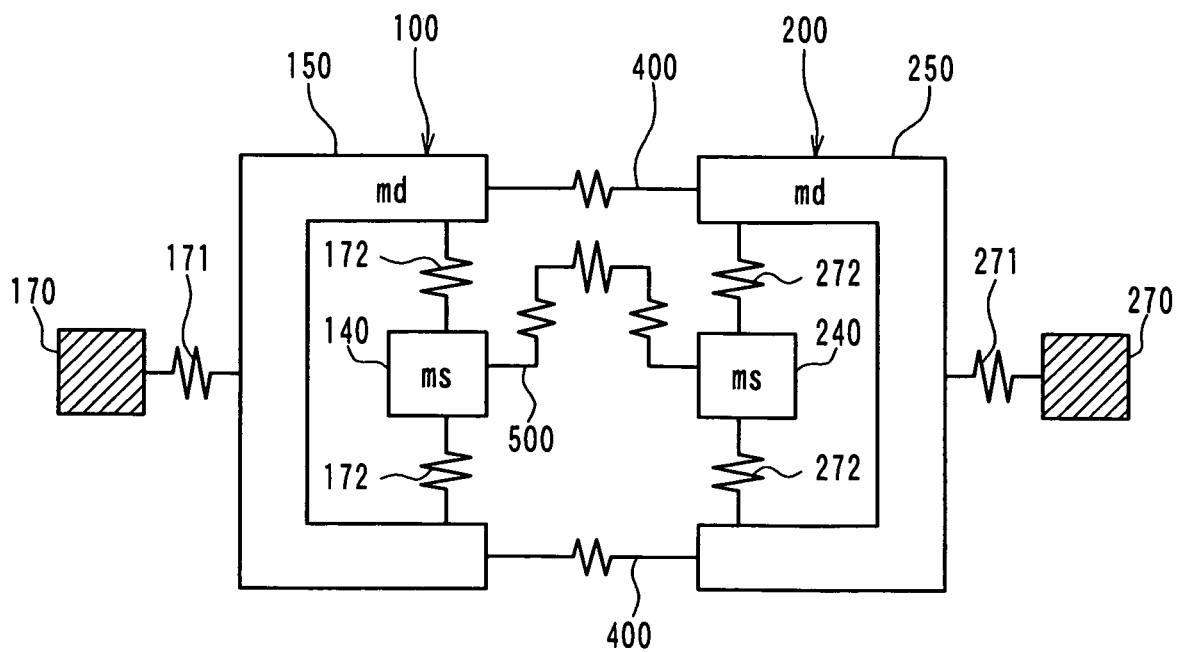
FIG. 4 is a schematic view showing an equivalent model of the oscillation angular velocity sensor shown in FIG. 1.

FIG. 4 is a schematic view showing an equivalent model of the oscillation angular velocity sensor shown in FIG. 1. As shown in FIG. 4, the driver weight 150 (md) of the first oscillator 100 and the driver weight 250 (md) of the second oscillator 200 are directly connected with each other through the driver joint beam 400. In this way, the driver weights 150, 250 of the oscillators 100, 200 are integrated. Thereby, the driver weights 150, 250 cause substantially the same motion when a large impact is applied from an external object to the oscillation angular velocity sensor. That is, the driver weights 150, 250 are directly hung by the driver joint beams 400. In the present structure, motion of one of the driver weights 150, 250 is synchronized with motion of the other of the driver weights 150, 250.

In addition, the detector weight 140 (ms) of the first oscillator 100 and the detector weight 240 (ms) of the second oscillator 200 are directly connected with each other through the detector joint beams 500. In this way, the detector weights 140, 240 of the oscillators 100, 200 are integrated. The detector weights 140, 240 are directly hung by the detector joint beams 500. In the present structure, motion of one of the detector weights 140, 240 is synchronized with motion of the other of the detector weights 140, 240 when a large impact is applied from an external object to the oscillation angular velocity sensor.

When an impact is applied to the oscillation angular velocity sensor, an inertial force is caused to move the driver weights 150, 250 in combination and the detector weights 140, 240 in combination in the direction of the impact. That is, an impact from an external object causes the same motion in the oscillators 100, 200. Therefore, a component of an impact included in movement of the movable detector electrodes 141, 241 can be offset and removed by subtracting movement of one of the movable detector electrodes 141, 241 from the other of the movable detector electrodes 141, 241. That is, a component of an impact can be offset and removed by subtracting a voltage applied to one of the servo electrodes 131, 231 from a voltage applied to the other of the servo electrodes 131, 231. In this way, an angular velocity can be steadily detected and outputted substantially regardless of an impact.

As described above, in the present embodiment, the driver weights 150, 250 are directly hung by the driver joint beams 400 to be integrated with each other. In addition, the detector weights 140, 240 are directly hung by the detector joint beams 500 to be integrated with each other.

In the present structure, the driver weights 150, 250 move in combination, and the detector weights 140, 240 move in combination. Therefore, both synchronism between the driver weights 150, 250 and synchronism between the detector weights 140, 240 can be enhanced with respect to an impact exerted from an external object to the oscillation angular velocity sensor.

Therefore, when the oscillation angular velocity sensor is applied with an impact from an external object, all the detector weights 140, 240 and the driver weights 150, 250 of the oscillators 100, 200 move together in the direction of the impact. Thus, movement of the movable detector electrode 141 of the first oscillator 100 and movement of the movable detector electrode 241 of the second oscillator 200 can be offset when moved by an impact. Specifically, the voltage applied to the servo electrodes 131, 231 can be offset. In this way, a component of an impact can be removed from an angular velocity.

Furthermore, in the present embodiment, the spring portions 600 are provided in the detector joint beams 500 and the driver joint beams 400. In the present structure, the driver joint beams 400 are configured to partially expand and contract. Therefore, the driver weights 150, 250 of the oscillators 100, 200 connected through the driver joint beams 400 are movable opposite from each other in the extended direction of the driver joint beams 400 (x-axis direction). In addition, the detector joint beams 500 are configured to partially expand and contract. Therefore, the detector weights 140, 240 of the oscillators 100, 200 connected through the detector joint beams 500 are movable opposite from each other in the extended direction of the detector joint beams 500 (x-axis direction) and the direction (y-axis direction) perpendicular to the extended direction.

In particular, each detector joint portion 510 of the detector joint beam 500 is in a horseshoe-shape (U-shape), and the spring portion 600 is provided in each of the components of the horseshoe-shaped structure. Thereby, each detector joint beam 500 can expand and contract in both the x-axis direction and the y-axis direction. In the present embodiment, when the detector weights 140, 240 are driven in opposite phases, a Coriolis force is caused in the detector weights 140, 240, and the Coriolis force moves the detector weights 140, 240 opposite in the y-axis direction.

In the present embodiment, the detector weights 140, 240 are directly hung by the two detector joint beams 500. Therefore, stress exerted from the detector weights 140, 240 to the detector joint beams 500 can be distributed to the two detector joint beams 500. Further, when the detector weights 140, 240 start to rotate around the z-axis, stress caused by the rotation and exerted by the detector weights 140, 240 is distributed (divided) into the two detector joint beams 500. Therefore, stress caused by rotation and exerted to each of the detector joint beams 500 can be reduced. Consequently, stress caused by rotation and exerted to the detector weights 140, 240 and the driver weights 150, 250, which are indirectly connected to the detector joint beams 500 through the detector weights 140, 240, can be released.

The stationary detector electrodes 130, 230 and the servo electrodes 131, 231 may be equivalent to a stationary detector electrode.

Second Embodiment

As follows, subjects different from those in the first embodiment will be described. The oscillation angular velocity sensor according to the above-described first embodiment has the outer-driver-inner-detector structure in which the driver weights 150, 250 are respectively located outside of the detector weights 140, 240. In the second embodiment, the oscillation angular velocity sensor has an inner-driver-outer-detector structure.

Figure 5:
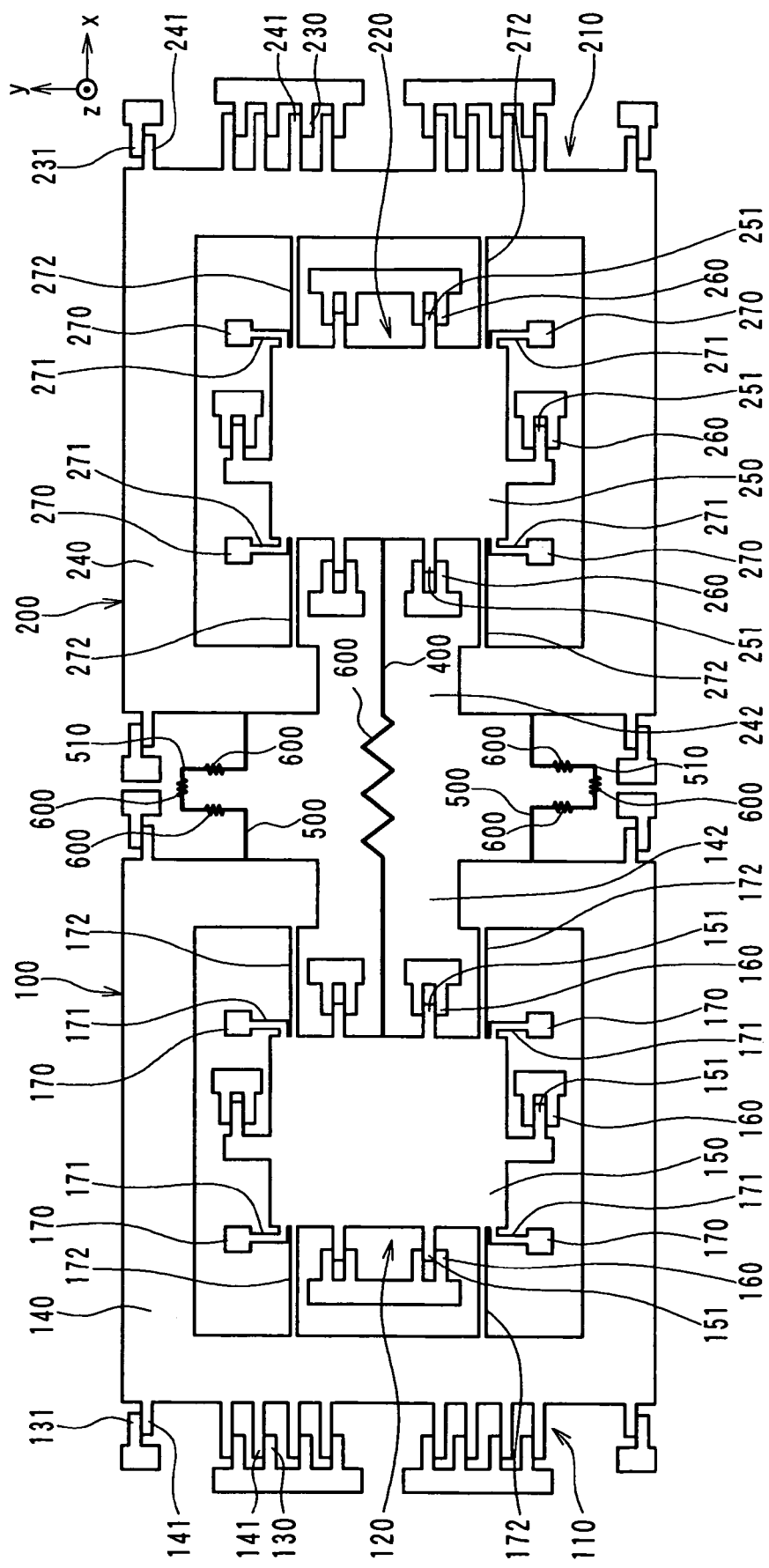
FIG. 5 is a top view showing an oscillation angular velocity sensor according to a second embodiment of the present invention.

FIG. 5 is a top view showing the oscillation angular velocity sensor according to the present embodiment. In FIG. 5, the peripheral portion 300 and electrodes are partially omitted. The oscillators 100, 200 have equivalent structures. Therefore, the structure of the oscillators 100, 200 will be described together.

As shown in FIG. 5, each of the detector weights 140, 240 is in a rectangular frame shape. The movable detector electrodes 141, 241 are respectively provided in the outer periphery of the detector weights 140, 240 and extended in parallel with the x-axis. The stationary detector electrodes 130, 230 and the servo electrodes 131, 231 are respectively located around the detector weights 140, 240 and respectively opposed to the movable detector electrodes 141, 241.

The driver weights 150, 250 are respectively located inside of the detector weights 140, 240 each being in a rectangular frame shape. In the present embodiment, each of the driver weights 150, 250 is in a block form. The movable driver electrodes 151, 251 are respectively provided in the outer periphery of the driver weights 150, 250 and extended in parallel with the x-axis. The stationary driver electrodes 160, 260 are respectively located around the periphery of the driver weights 150, 250. Specifically, the stationary driver electrodes 160, 260 are respectively located between the detector weights 140, 240 and the driver weights 150, 250. The stationary driver electrodes 160, 260 are respectively opposed to the movable driver electrodes 151, 251.

The support beams 172, 272 are respectively located between the detector weights 140, 240 and the driver weights 150, 250. The support beams 172, 272 respectively connect the detector weights 140, 240 with the driver weights 150, 250. The stationary portions 170, 270 are respectively located between the detector weights 140, 240 and the driver weights 150, 250. The driver beams 171, 271 respectively connect the stationary portions 170, 270 with the driver weights 150, 250. Thus, the detector weights 140, 240 and the driver weights 150, 250 are floated on the supporting board 11 respectively by the stationary portions 170, 270, the driver beams 171, 271, and the support beams 172, 272 to be at a constant distance relative to the supporting board 11.

The detector weights 140, 240 are opposed to each other at opposed portions, and the opposed portions respectively have openings 142, 242. In the present structure, the driver weights 150, 250 respectively located inside of the detector weights 140, 240 are opposed to each other through the openings 142, 242. The driver joint beam 400 directly connects the driver weight 150 of the first oscillator 100 with the driver weight 250 of the second oscillator 200 through the openings 142, 242 of the detector weights 140, 240.

In this way, the detector weights 140, 240 are respectively located outside of the driver weights 150, 250 to form the inner-driver-outer-detector structure. In such an inner-driver-outer-detector structure, the driver weights 150, 250 are respectively surrounded by the detector weights 140, 240. Therefore, the openings 142, 242 respectively provided in the detector weights 140, 240 enable the driver joint beams 400 to connect the driver weights 150, 250 directly with each other.

The detector joint beams 500 are located between the detector weight 140 of the first oscillator 100 and the detector weight 240 of the second oscillator 200. The detector joint beams 500 directly connect the detector weights 140, 240 with each other. The detector weights 140, 240 are opposed to each other at the opposed portions. One of the detector joint beams 500 directly connects one opening end of the opening 142 of the opposed portion of the detector weight 140 with one opening end of the opening 242 of the opposed portion of the detector weight 240. The other of the detector joint beams 500 directly connects the other opening end of the opening 142 of the opposed portion of the detector weight 140 with the other opening end of the opening 242 of the opposed portion of the detector weight 240. In the present structure, the driver joint beam 400 is interposed, between the detector joint beams 500.

In the present embodiment, the detector joint portion 510 is provided in the detector joint beam 500. In addition, the spring portions 600 are, provided in the detector joint portion 510. The spring portion 600 is provided in the driver joint beam 400.

Figure 6:
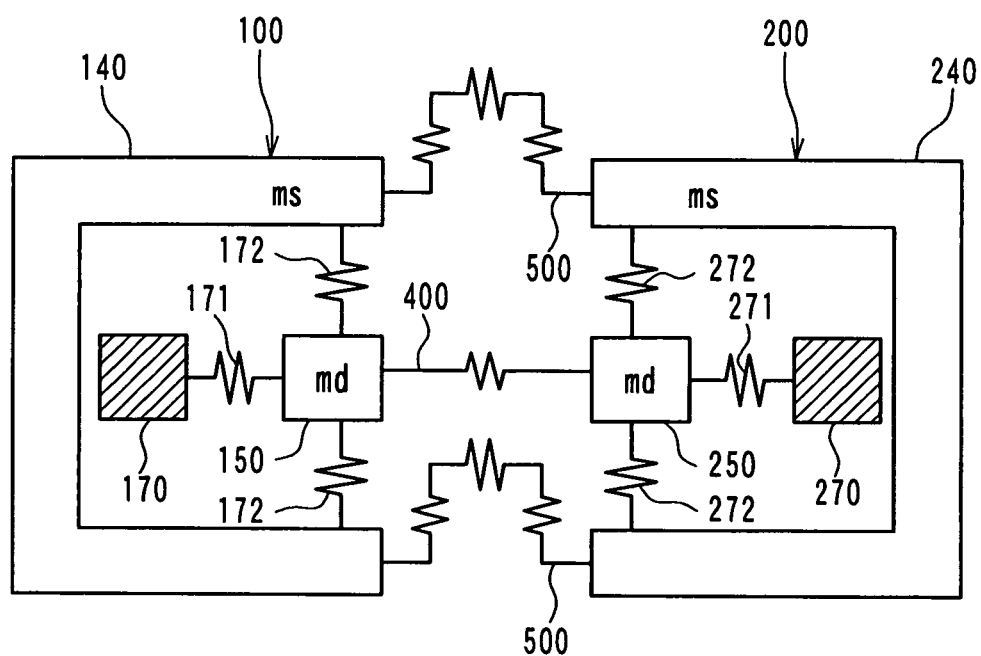
FIG. 6 is a schematic view showing an equivalent model of the oscillation angular velocity sensor shown in FIG. 5.

FIG. 6 is a schematic view showing an equivalent model of the oscillation angular velocity sensor shown in FIG. 5. In the inner-driver-outer-detector structure shown in FIG. 6, similarly to the first embodiment, the driver joint beam 400 directly connects the driver weight 150 (md) of the first oscillator 100 with the driver weight 250 (md) of the second oscillator 200. In addition, the detector joint beams 500 directly connect the detector weight 140 (ms) of the first oscillator 100 with the detector weight 240 (ms) of the second oscillator 200.

In the present structure, the driver weights 150, 250 are directly hung by the driver joint beam 400, and the detector weights 140, 240 are directly hung by the detector joint beam 500. Therefore, when a large impact is applied from an external object to the oscillation angular velocity sensor, motion of one of the driver weights 150, 250 is synchronized with motion of the other of the driver weights 150, 250. In addition, when a large impact is applied from an external object to the oscillation angular velocity sensor, motion of one of the detector weights 140, 240 is synchronized with motion of the other of the detector weights 140, 240. In this way, the oscillators 100, 200 cause the same motion in response to an impact from an exterior object. Therefore, a component of an impact can be offset and removed from the angular velocity obtained by using the oscillators 100, 200.

In this way, the detector weights 140, 240 are respectively located outside of the driver weights 150, 250 to form the inner-driver-outer-detector structure. In such an inner-driver-outer-detector structure, the openings 142, 242 respectively provided in the detector weights 140, 240 enable the driver joint beams 400 to directly connect the driver weights 150, 250 with each other. Therefore, the driver weights 150, 250 can be directly connected via the driver joint beam 400, and the detector weights 140, 240 can be directly connected via the detector joint beam 500.

Third Embodiment

As follows, subjects different from those in the first and second embodiments will be described. In the above embodiments, the detector weights 140, 240, the driver weights 150, 250, the detector joint beams 500, and the driver joint beams 400 are formed in the same level (same layer) in the semiconductor layer 12. In the present embodiment, the detector joint beams 500 are located in a level different from the level of the detector weights 140, 240, the driver weights 150, 250, and the driver joint beams 400, thereby to form a multilayer structure.

Figure 7:
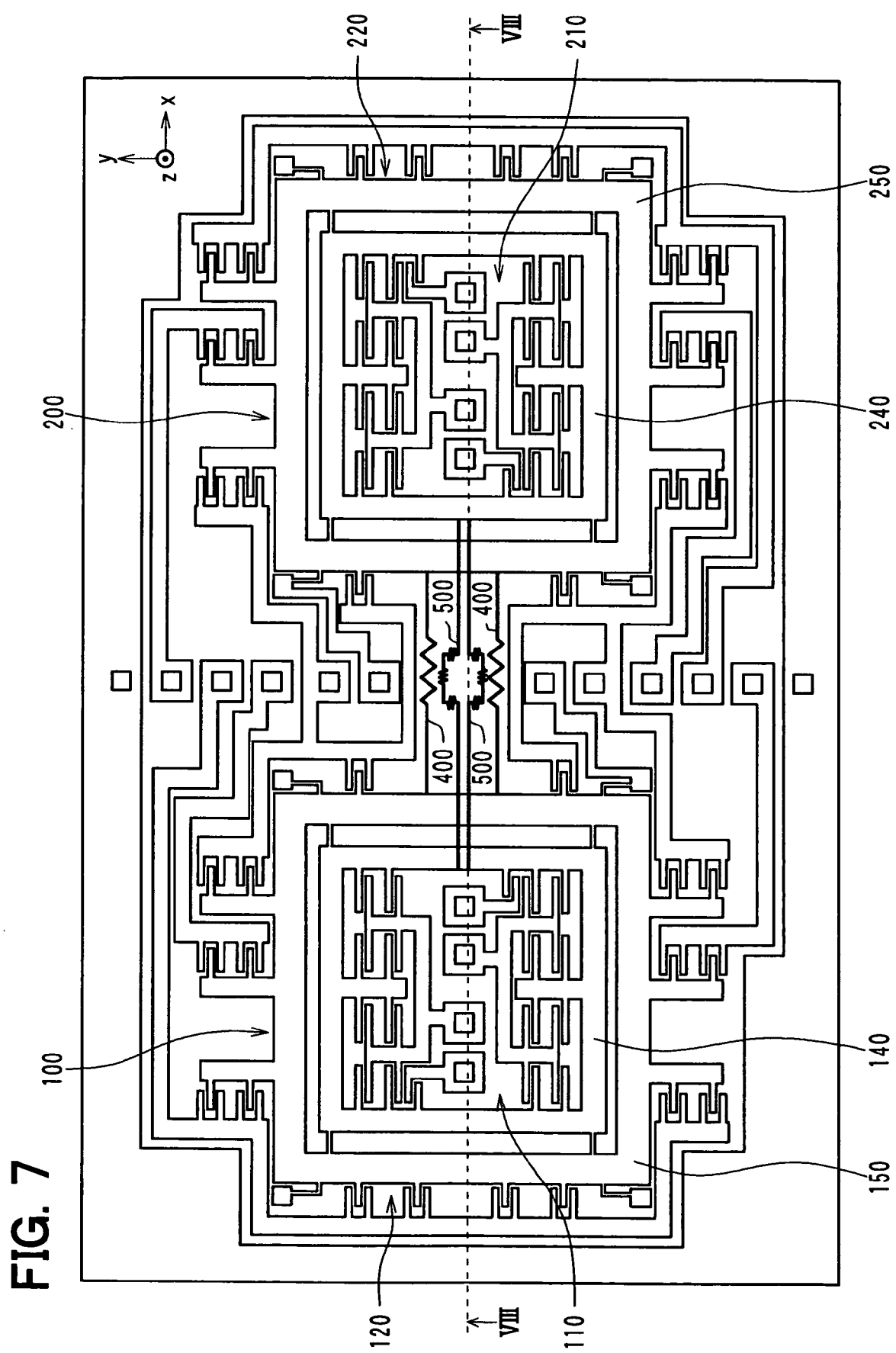
FIG. 7 is a top view showing an oscillation angular velocity sensor according to a third embodiment of the present invention.
Figure 8:
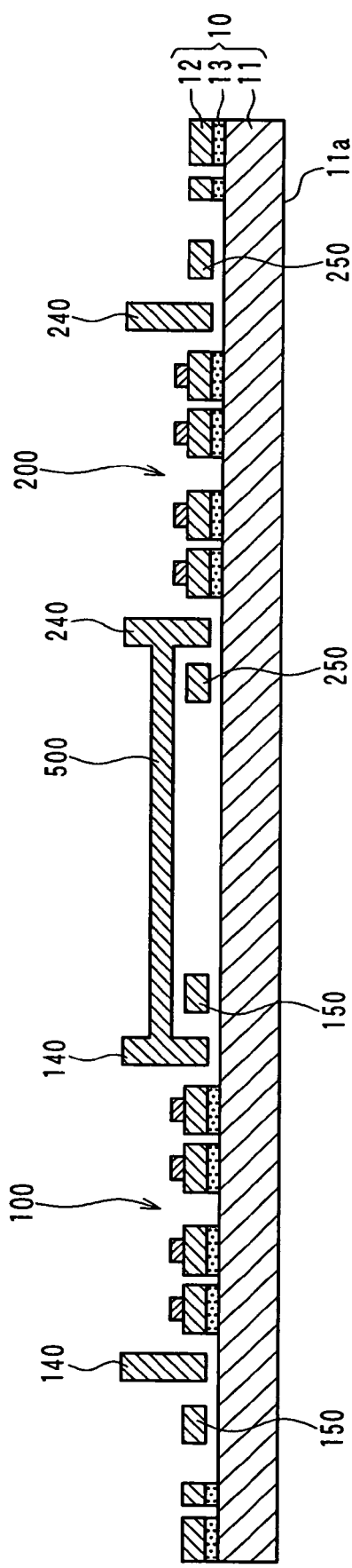
FIG. 8 is a sectional view taken along the line VIII-VIII in FIG. 7.

FIG. 7 is a top view showing the oscillation angular velocity sensor according to the present embodiment. FIG. 8 is a sectional view taken along the line VIII-VIII in FIG. 7.

In the present embodiment, the semiconductor layer 12 of the substrate 10 has a multilayer structure including multiple layers. The detector portions 110, 210, the driver portions 120, 220, and the peripheral portion 300 are formed in the lowest level closed to the sacrifice layer 13 in the multilayer structure.

As shown in FIG. 7, each of the driver weights 150, 250 is in a rectangular frame shape similarly to the first embodiment. In the present embodiment, the openings 152, 252 are not formed in the driver weights 150, 250. Therefore, each of the driver weights 150, 250 has a closed structure. As shown in FIG. 8, the driver weights 150, 250 are located at the lowest level of the semiconductor layer 12 having a multilayer structure.

The driver joint beams 400 are located at the same level as the driver weights 150, 250. That is, the driver joint beams 400 are located at the lowest level in the multilayer structure. The driver joint beams 400 connect the driver weight 150 of the first oscillator 100 with the driver weight 250 of the second oscillator 200.

The detector weights 140, 240 are respectively located inside of the driver weights 150, 250. As shown in FIG. 8, the detector weights 140, 240 are located at, a higher level than the driver weights 150, 250 from the other surface 11a (reference level) on the opposite side of the one surface of the substrate 10. The other surface 11a on the opposite side of the one surface of the substrate 10 is equivalent to a surface on the opposite side of a surface of the supporting board 11 on the side of the sacrifice layer 13.

That is, the detector weights 140, 240 are formed at both the lowest level of the multilayer structure of the semiconductor layer 12 and the layer located on the upper side of the lowest level. In this way, the detector weights 140, 240 are formed over the multiple layers in the multilayer structure of the semiconductor layer 12. Thereby, the detector weights 140, 240 are thicker than the driver weights 150, 250 formed at the lowest level in the multilayer structure. Therefore, the detector weights 140, 240 are projected from the driver weights 150, 250 with respect to the other surface 11a (reference) of the substrate 10.

The detector joint beams 500 are located at the higher level than the driver weights 150, 250. That is, the detector joint beams 500 are formed in the layer located at the higher level than the driver weights 150, 250 not to be in contact with the driver weights 150, 250. In this way, the detector joint beams 500 extend beyond the driver weights 150, 250. In addition, the detector joint beams 500 directly connect the detector weight 140 of the first oscillator 100 with the detector weight 240 of the second oscillator 200.

As described above, in the outer-driver-inner-detector structure, the detector weights 140, 240 are respectively surrounded by the driver weights 150, 250. In the present embodiment, as noted above, the semiconductor layer 12 has the multilayer structure including the multiple layers. Thereby, the detector joint beams 500 can be located at the level different from the level of the driver weights 150, 250 and the driver joint beam 400. The detector weights 140, 240 are located higher than the driver weights 150, 250. In addition, the detector joint beams 500 are located at the level higher than the driver weights 150, 250. Therefore, the detector weights 140, 240 can be directly connected through the detector joint beams 500, without the openings 152, 252 formed in the driver weights 150, 250.

In this case, the openings 152, 252 need not be formed in the driver weights 150, 250. Consequently, each of the driver weights 150, 250 is in a closed rectangular frame shape. Therefore, rigidity of the driver weights 150, 250 can be enhanced.

Fourth Embodiment

As follows, subjects different from those in the third embodiment will be described. In the third embodiment, the oscillation angular velocity sensor has the outer-driver-inner-detector structure, and the semiconductor layer 12 has the multilayer structure. Thereby, the detector joint beam 500 is located at the level higher than the driver weights 150, 250 and the like. In the present embodiment, the oscillation angular velocity sensor has the inner-driver-outer-detector structure, and the semiconductor layer 12 has the multilayer structure.

In this case, (not shown), each of the detector weights 140, 240 is in a rectangular frame shape, and the openings 142, 242 are not formed. That is, each of the detector weights 140, 240 has a closed structure. The detector joint beams 500 are located at the same level as the driver weights 150, 250. That is, the detector joint beams 500 are located at the lowest level in the multilayer structure of the semiconductor layer 12. The detector joint beams 500 connect the detector weight 140 of the first oscillator 100 with the detector weight 240 of the second oscillator 200.

The driver weights 150, 250 are respectively located inside of the detector weights 140, 240. In this way, the driver weights 150, 250 are formed over the multiple layers in the multilayer structure of the semiconductor layer 12. Thereby, the driver weights 150, 250 are thicker than the detector weights 140, 240 formed at the lowest level in the multilayer structure. Therefore, the driver weights 150, 250 are higher than the detector weights 140, 240 with respect to the other surface 11a (reference) of the substrate 10.

The driver joint beams 400 are located at the higher level than the detector weights 140, 240 not to be in contact with the detector weights 140, 240. In this way, the driver joint beams 400 extend beyond the detector weights 140, 240. In addition, the driver joint beams 400 directly connect the driver weight 150 of the first oscillator 100 with the driver weight 250 of the second oscillator 200.

As described above, in the inner-driver-outer-detector structure, the driver weights 150, 250 are higher than the detector weights 140, 240, and the driver joint beams 400 are located at the higher level of the detector weights 140, 240. Therefore, the driver joint beams 400 can directly connect the driver weights 150, 250 with each other.

In this case, the openings 142, 242 need not be formed in the detector weights 140, 240. Consequently, each of the detector weights 140, 240 is in a closed rectangular frame shape. Therefore, rigidity of the detector weights 140, 240 can be enhanced.

Fifth Embodiment

Figure 9:
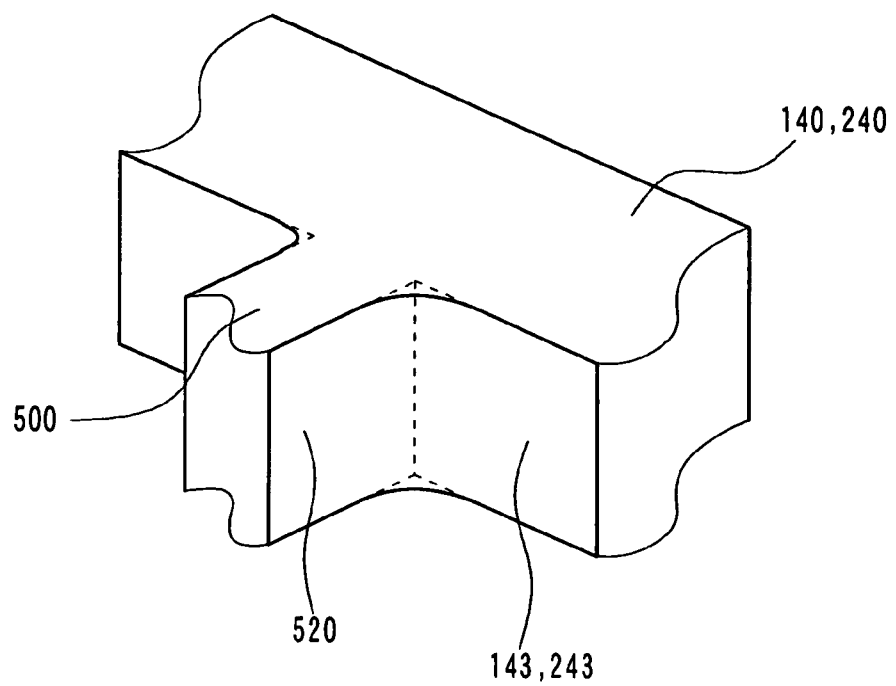
FIG. 9 is a perspective view showing a joint portion between a detector joint beam and a detector weight, according to a fifth embodiment.

As follows, subjects different from those in the first to fourth embodiments will be described. FIG. 9 is a perspective view showing a joint portion between a detector joint beam 500 and the detector weights 140, 240, according to the present embodiment.

As shown in FIG. 9, the detector weights 140, 240 have lateral sides 143, 243 perpendicular to the one surface of the substrate 10. The detector joint beam 500 has a lateral side 520 perpendicular to the one surface of the substrate 10. A joint portion between the lateral sides 143, 243 of the detector weights 140, 240 and the lateral side 520 of the detector joint beam 500 is chamfered. In this way, the thickness of the joint portion between the detector joint beam 500 and the detector weights 140, 240 is increased. Thus, the strength of the joint portion between the detector joint beam 500 and the detector weights 140, 240 can be enhanced. Consequently, stress applied to the joint portion can be reduced when the detector weights 140, 240 exert force to the detector joint beam 500.

A joint portion between the detector joint beam 500 and the driver weights 150, 250 may be chamfered, as shown in FIG. 9.

Other Embodiment

In the above embodiments, a silicon-on-insulator board is employed as the substrate 10. The silicon-on-insulator board is one example of the substrate 10 and may be a material other than a silicon-on-insulator board.

In the first embodiment, the driver joint beams 400 are connected to the opening ends of the openings 152, 252 of the driver weights 150, 250. It is noted that the connection positions of the driver joint beams 400 to the driver weights 150, 250 are one example. The driver joint beam 400 may be connected to a portion other than the opening end of the openings 152, 252 of the driver weights 150, 250.

In the second embodiment, the two detector joint beams 500 are connected to the detector weight 140 of the first oscillator 100 and the driver weight 250 of the second oscillator 200. The connection positions of the detector joint beams 500 to the detector weights 140, 240 are one example and may be other connection positions.

In the above embodiments, the driver joint beam 400 and the detector joint beam 500 (detector joint portion 510) are partially in a zigzag wave shape to form the spring portions 600 shown in FIG. 3. The structure of the spring portion 600 shown in FIG. 3 is one example. The spring portion 600 may have another structure. For example, a part of the driver joint beam 400 and a part of the detector joint beam 500 (detector joint portion 510) may be in a V-shape or an arc shape to form the spring portion 600. The spring portion 600 may include two parallel beams connected at both ends to be in a rectangular frame shape. In this case, the spring portion 600 may function as a spring deformable in a direction perpendicular to the longitudinal direction of the two beams. In consideration of a space accommodating the spring portion 600 or the like, the spring portion 600 may be in at least one of a zigzag wave shape, a V-shape, and an arc shape. The spring portion 600 may be in different shapes.

In the above embodiments, three spring portions 600 are provided in one element of the detector joint beam 500, and one spring portion 600 is provided in one element of the driver joint beam 400. The number of the spring portions 600 is one example. The number of the spring portion(s) 600 provided in one element of the detector joint beam 500 and one element of the driver joint beam 400 may be arbitrary determined.

In the above embodiments, one detector joint portion 510 is provided in one element of the detector joint beam 500. It is noted that multiple detector joint portions 510 may be provided in one element of the detector joint beam 500.

In the above embodiments, the detector joint beam 500 is provided with the horseshoe-shaped (U-shaped) detector joint portion 510. The shape of the detector joint portion 510 is not limited to the U-shape and may be another shape. For example, the shape of the detector joint portion 510 may be in a V-shape, a trapezoidal shape, a rhombus shape, or the like.

In the above embodiments, the driver weights 150, 250 are directly connected with each other through the two detector joint beams 500. The number of the detector joint beams 500 is one example. The number of the detector joint beams 500 may be one and may be three or more. For example, the position of the spring portions 600 in one element of the driver joint beam 400 and the position of the spring portion 600 in one element of the detector joint beam 500 may be arranged symmetric (line symmetric) in the x-axis direction. In this case, symmetry of movement of the driver weights 150, 250 and the detector weights 140, 240 can be enhanced.

Figure 10:
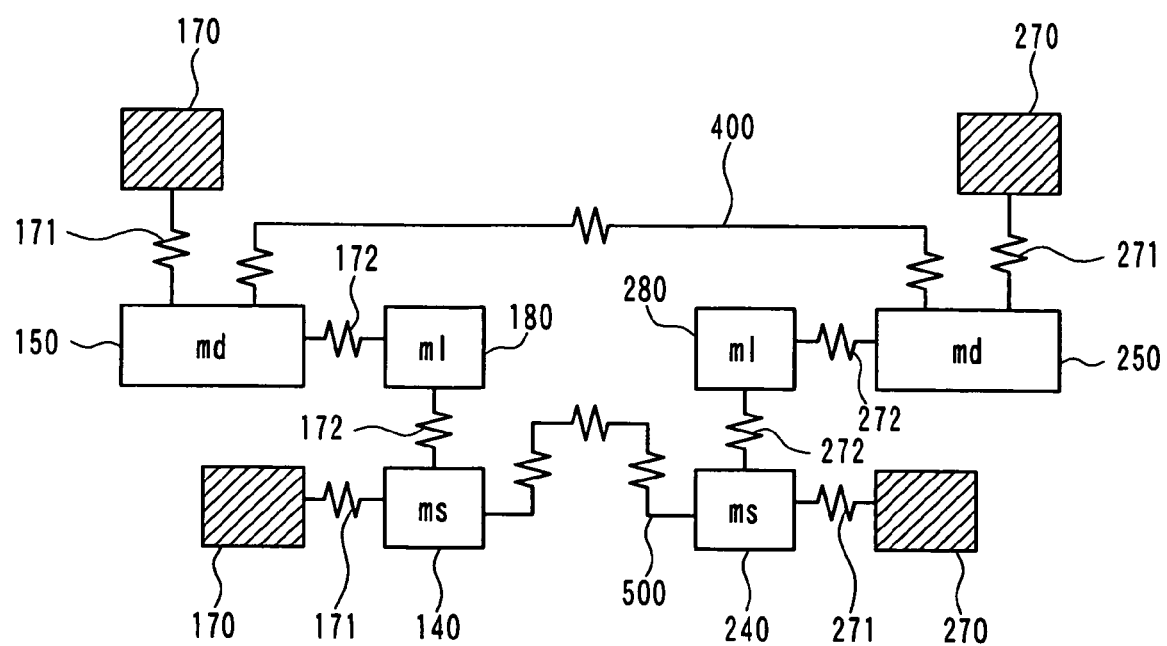
FIG. 10 is a schematic view showing a structural model including a link portion between a detector weight and a driver weight, according to an other embodiment.

In the above embodiments, the detector weights 140, 240 and the driver weights 150, 250 are directly connected with the support beams 172, 272. Alternatively, an additional weight may be connected between the detector weights 140, 240 and the driver weights 150, 250. For example, as shown in the model of FIG. 10, link portions 180, 280 (ml) may be provided as an additional weight between the detector weights 140, 240 and the driver weights 150, 250, and these components may be connected through the support beams 172, 272. When the link portions 180, 280 are provided in this way, the detector weights 140, 240 can be directly connected through the detector joint beam 500, and the driver weights 150, 250 can be directly connected through the driver joint beam 400.

Summarizing the above embodiments, the driver weight 150 of the first oscillator 100 and the driver weight 250 of the second oscillator 200 are directly connected through the driver joint beam 400. The detector weight 140 of the first oscillator 100 and the detector weight 240 of the second oscillator 200 are directly connected through the detector joint beam 500.

In the present structure, the driver weights 150, 250 of the oscillators 100, 200 are combined by the driver joint beam 400, and the detector weights 140, 240 of the oscillators 100, 200 are combined by the detector joint beam 500. Therefore, synchronism between the driver weights 150, 250 and synchronism between the detector weights 140, 240 can be enhanced with respect to an impact from an external object.

The driver joint beam 400 includes the spring portion 600. A part of the driver joint beam 400 has the spring portion 600 to expand and contract in the extended direction of the driver joint beam 400. The detector joint beam 500 includes the detector joint portion 510 formed by bending a part of the detector joint beam 500. The detector joint beam 500 further includes the spring portion 600 formed in a part of the detector joint portion 510. The spring portion 600 expands and contracts so that the detector weight 140 of the first oscillator 100 and the detector weight 240 of the second oscillator 200 move in both the extended direction of the detector joint beam 500 and the direction perpendicular to the extended direction of the detector joint beam 500.

In the present structure, the driver weight 150 of the first oscillator 100 and the driver weight 250 of the second oscillator 200 connected with each other through the driver joint beam 400 are movable opposite in the extended direction of the driver joint beam 400.

In addition, the detector weight 140 of the first oscillator 100 and the detector weight 240 of the second oscillator 200 connected with each other through the detector joint beam 500 are movable opposite in both the extended direction of the detector joint beam 500 and the direction perpendicular to the extended direction.

A part of the detector joint beam 500 is bent to be perpendicular to the extended direction of the detector joint beam 500 to form the detector joint portion 510 in a U-shape. The spring portion 600 of the detector joint beam 500 is provided to each of a first portion and a second portion of the U-shaped detector joint portion 510. The first portion is in parallel with the extended direction of the detector joint beam 500. The second portion is in parallel with the direction perpendicular to the extended direction of the detector joint beam 500.

In the present structure, a part of the detector joint portion 510 expands and contracts in both the extended direction of the detector joint beam 500 and the direction perpendicular to the extended direction of the detector joint beam 500. Therefore, the detector weight 140 of the first oscillator 100 and the detector weight 240 of the second oscillator 200 connected with each other through the detector joint beam 500 are movable opposite in both the extended direction of the detector joint portion 510 and the direction perpendicular to the extended direction.

The spring portion 600 may be in at least one of a wave shape, a V-shape, and an arc shape.

The detector weights 140, 240 have the lateral sides 143, 243 perpendicular to the one surface of the substrate 10. The detector joint beam 500 has the lateral side 520 perpendicular to the one surface of the substrate 10. A joint portion between the lateral sides 143, 243 of the detector weights 140, 240 and the lateral side 520 of the detector joint beam 500 is chamfered.

In this way, the thickness of the joint portion between the detector joint beam 500 and the detector weights 140, 240 is increased. Therefore, stress caused in the joint portion can be reduced.

The detector joint beam 500 includes at least two detector joint beam elements 500. The detector weight 140 of the first oscillator 100 and the detector weight 240 of the second oscillator 200 are directly connected with each other through the at least two detector joint beam elements 500.

In the present structure, stress exerted from the detector weights 140, 240 can be distributed into the at least two detector joint beam elements 500. In addition, the at least two detector joint beam elements 500 function to prohibit rotation of the detector weights 140, 240 around an-axis perpendicular to the one side of the substrate 10. Therefore, stress caused by rotation of the detector weights 140, 240 and exerted to the detector joint beam 500 can be reduced. Consequently, stress caused by rotation and exerted to the detector weights 140, 240 and the driver weights 150, 250, which are indirectly connected to the detector joint beam elements 500, can be released.

Each of the driver weights 150, 250 is in a rectangular frame shape. The driver weights 150, 250 respectively have opposed portions through which the driver weights 150, 250 are opposed. The opposed portions respectively have the openings 152, 252. The detector weights 140, 240 are respectively located inside of the driver weights 150, 250. The detector joint beam 500 directly connects the detector weight 140 of the first oscillator 100 with the detector weight 240 of the second oscillator 200 through the openings 152, 252 of the driver weights 150, 250.

In this way, the driver weights 150, 250 are respectively located outside of the detector weights 140, 240 to form an outer-driver-inner-detector structure. In such an outer-driver-inner-detector structure, the detector weights 140, 240 are respectively surrounded by the driver weights 150, 250. Therefore, the openings 152, 252 respectively provided in the driver weights 150, 250 enable the detector joint beam 500 to connect the detector weights 140, 240 directly with each other.

Each of the detector weights 140, 240 is in a rectangular frame shape. The detector weights 140, 240 respectively have opposed portions through which the detector weights 140, 240 are opposed. The opposed portions respectively have the openings 142, 242. The driver weights 150, 250 are respectively located inside of the detector weights 140, 240. The driver joint beam 400 directly connects the driver weight 150 of the first oscillator 100 with the driver weight 250 of the second oscillator 200 through the openings 142, 242 of the detector weights 140, 240.

In this way, the detector weights 140, 240 are respectively located outside of the driver weights 150, 250 to form the inner-driver-outer-detector structure. In such an inner-driver-outer-detector structure, the driver weights 150, 250 are respectively surrounded by the detector weights 140, 240. Therefore, the openings 142, 242 respectively provided in the detector weights 140, 240 enable the driver joint beam 400 to connect the driver weights 150, 250 directly with each other.

Each of the driver weights 150, 250 is in a rectangular frame shape. The detector weights 140, 240 are respectively located inside of the driver weights 150, 250. The detector weights 140, 240 are higher than the driver weights 150, 250 relative to the other surface 11a, which is a reference on the opposite side of the one surface of the substrate 10. The detector joint beam 500 is located at the level higher than the driver weights 150, 250. The detector joint beam 500 straddles the driver weights 150, 250 to connect the detector weight 140 of the first oscillator 100 directly with the detector weight 240 of the second oscillator 200. The driver joint beam 400 is located at the same level as the driver weights 150, 250. The driver joint beam 400 directly connects the driver weight 150 of the first oscillator 100 with the driver weight 250 of the second oscillator 200.

The driver weights 150, 250 are respectively located outside of the detector weights 140, 240 to form the outer-driver-inner-detector structure. In the outer-driver-inner-detector structure, the detector weights 140, 240 are respectively surrounded by the driver weights 150, 250. The detector weights 140, 240 are higher than the driver weights 150, 250. The detector joint beam 500 is located at the higher level than the driver weights 150, 250. Therefore, the detector weights 140, 240 can be directly connected by the detector joint beam 500.

In addition, each of the driver weights 150, 250 are in the closed rectangular frame shape. Therefore, rigidity of the driver weights 150, 250 can be enhanced.

Each of the detector weights 140, 240 is in a rectangular frame shape. The driver weights 150, 250 are respectively located inside of the detector weights 140, 240. The driver weights 150, 250 are higher than the detector weights 140, 240 relative to the other surface 11a, which is a reference on the opposite side of the one surface of the substrate 10. The driver joint beam 400 is located at the level higher than the detector weights 140, 240. The driver joint beam 400 straddles the detector weights 140, 240 to connect the driver weight 150 of the first oscillator 100 directly with the driver weight 250 of the second oscillator 200. The detector joint beam 500 is located at the same level as the detector weights 140, 240. The detector joint beam 500 directly connects the detector weight 140 of the first oscillator 100 with the detector weight 240 of the second oscillator 200.

The detector weights 140, 240 are respectively located outside of the driver weights 150, 250 to form the inner-driver-outer-detector structure. In the inner-driver-outer-detector structure, the driver weights 150, 250 are respectively surrounded by the detector weights 140, 240. The driver weights 150, 250 are higher than the detector weights 140, 240. The driver joint beam 400 is located at the higher level than the detector weights 140, 240. Therefore, the driver weights 150, 250 can be directly connected by the driver joint beam 400.

In addition, each of the detector weights 140, 240 are in the closed rectangular frame shape. Therefore, rigidity of the detector weights 140, 240 can be enhanced.

The driver weights 150, 250 respectively drive the detector weights 140, 240 in the driving direction so that the detector weight 140 of the first oscillator 100 and the detector weight 240 of the second oscillator 200 are in opposite phases.

In the present structure, the movable detector electrodes 141, 241 of the oscillators 100, 200 oscillate in the opposite phases. Therefore, when being applied with an angular velocity around the axis perpendicular to the one side of the substrate 10, the movable detector electrodes 141, 241 are moved opposite by a Coriolis force. In addition, when an impact is applied to the oscillation angular velocity sensor, the movable detector electrodes 141, 241 are moved in the same direction as an impact by an inertial force. Accordingly, a component of the impact included in movement of the detector electrodes 141, 241 can be offset and removed by subtracting movement of one of the movable detector electrodes 141, 241 from movement of the other of the movable detector electrodes 141, 241.

The above structures of the embodiments can be combined as appropriate. It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An oscillation angular velocity sensor comprising:
    a first oscillator and a second oscillator each including:
        a detector portion formed in one surface of a substrate, the detector portion including a stationary detector electrode, which is supported by the substrate, and a detector weight, which includes a movable detector electrode opposed to the stationary detector electrode and movable relative to the stationary detector electrode; and
        a driver portion formed in the one surface of the substrate, the driver portion including a driver weight, which includes a movable driver electrode configured to oscillate the detector portion in a driving direction perpendicular to a moving direction of the movable detector electrode, and a stationary driver electrode opposed to the movable driver electrode, wherein
    the oscillation angular velocity sensor is configured to, when an angular velocity occurs while the detector portion is oscillated, detect the angular velocity according to a variation in an electric capacitance, the variation being caused by change in a distance between the stationary detector electrode and the movable detector electrode moved by a Coriolis force applied to the detector portion,
    the driver weight of the first oscillator and the driver weight of the second oscillator are directly connected through a driver joint beam,
    the detector weight of the first oscillator and the detector weight of the second oscillator are directly connected through a detector joint beam, wherein
    the driver weight of the first oscillator is in a rectangular frame shape,
    the driver weight of the second oscillator is in a rectangular frame shape,
    the detector weight of the first oscillator is located inside of the driver weight of the first oscillator,
    the detector weight of the second oscillator is located inside of the driver weight of the second oscillator,
    the detector weight of the first oscillator and the detector weight of the second oscillator are higher than the driver weight of the first oscillator and the driver weight of the second oscillator relative to an other surface, which is a reference surface on an opposite side of the one surface of the substrate,
    the detector joint beam is located at a level higher than a level of the driver weight of the first oscillator and a level of the driver weight of the second oscillator,
    the detector joint beam straddles the driver weight of the first oscillator and the driver weight of the second oscillator to directly connect the detector weight of the first oscillator with the detector weight of the second oscillator,
    the driver joint beam is located at a level same as the level of the driver weight of the first oscillator and the level of the driver weight of the second oscillator, and
    the driver joint beam directly connects the driver weight of the first oscillator with the driver weight of the second oscillator.

2. The oscillation angular velocity sensor according to claim 1, wherein
    the driver joint beam includes a spring portion configured to expand and contract a part of the driver joint beam in an extended direction of the driver joint beam,
    the detector joint beam includes:
        a detector joint portion being a bent portion of the detector joint beam; and
        a spring portion being a part of the detector joint portion, the spring portion configured to expand and contract to move the detector weight of the first oscillator and the detector weight of the second oscillator in both an extended direction of the detector joint beam and a direction perpendicular to the extended direction of the detector joint beam.

3. The oscillation, angular velocity sensor according to claim 2, wherein
the detector joint portion is a U-shape portion of the detector joint beam, the detector joint portion being bent to be perpendicular to the extended direction of the detector joint beam,
the spring portion of the detector joint portion is provided to each of a first portion and a second portion of the U-shaped portion,
the first portion is in parallel with the extended direction of the detector joint beam, and
the second portion is perpendicular to the extended direction of the detector joint beam.

4. The oscillation angular velocity sensor according to claim 2, wherein
the spring portion of the driver joint beam or the detector joint beam is in at least one of a wave shape, a V-shape, and an arc-shape.

5. The oscillation angular velocity sensor according to claim 1, wherein
the detector weight has a lateral side perpendicular to the one surface of the substrate,
the detector joint beam has a lateral side perpendicular to the one surface of the substrate,
the lateral side of the detector weight and the lateral side of the detector joint beam have a joint portion therebetween, and
the joint portion is chamfered.

6. The oscillation angular velocity sensor according to claim 1, wherein
the detector joint beam includes a plurality of detector joint beam elements, and
the detector weight of the first oscillator and the detector weight of the second oscillator are directly connected through the plurality of detector joint beam elements.

7. The oscillation angular velocity sensor according to claim 1, wherein
the driver weight of the first oscillator is in a rectangular frame shape,
the driver weight of the second oscillator is in a rectangular frame shape,
the detector weight of the first oscillator is located inside of the driver weight of the first oscillator,
the detector weight of the second oscillator is located inside of the driver weight of the second oscillator,
the driver weight of the first oscillator and the driver weight of the second oscillator respectively have opposed portions through which the driver weight of the first oscillator and the driver weight of the second oscillator are opposed,
the opposed portions respectively have openings,
the detector joint beam directly connects the detector weight of the first oscillator with the detector weight of the second oscillator through the openings, and
the detector joint beam is located at a level same as a level of the detector weight of the first oscillator and a level of the detector weight of the second oscillator.

8. The oscillation angular velocity sensor according to claim 1, wherein
the driver weight of the first oscillator is configured to drive the detector weight of the first oscillator in a driving direction, and
the driver weight of the second oscillator is configured to drive the detector weight of the second oscillator in a driving direction, so that the detector weight of the first oscillator and the detector weight of the second oscillator are in opposite phases.

9. An oscillation angular velocity sensor comprising:
a first oscillator and a second oscillator each including:
a detector portion formed in one surface of a substrate, the detector portion including a stationary detector electrode, which is supported by the substrate, and a detector weight, which includes a movable detector electrode opposed to the stationary detector electrode and movable relative to the stationary detector electrode; and
a driver portion formed in the one surface of the substrate, the driver portion including a, driver weight, which includes a movable driver electrode configured to oscillate the detector portion in a driving direction perpendicular to a moving direction of the movable detector electrode, and a stationary driver electrode opposed to the movable driver electrode, wherein
the oscillation angular velocity sensor is configured to, when an angular velocity occurs while the detector portion is oscillated, detect the angular velocity according to a variation in an electric capacitance, the variation being caused by change in a distance between the stationary detector electrode and the movable detector electrode moved by a Coriolis force applied to the detector portion,
the driver weight of the first oscillator and the driver weight of the second oscillator are directly connected through a driver joint beam,
the detector weight of the first oscillator and the detector weight of the second oscillator are directly connected through a detector joint beam, wherein
the detector weight of the first oscillator is in a rectangular frame shape,
the detector weight of the second oscillator is in a rectangular frame shape,
the driver weight of the first oscillator is located inside of the detector weight of the first oscillator,
the driver weight of the second oscillator is located inside of the detector weight of the second oscillator,
the driver weight of the first oscillator and the driver weight of the second oscillator are higher than the detector weight of the first oscillator and the detector weight of the second oscillator relative to an other surface, which is a reference surface on an opposite side of the one surface of the substrate,
the driver joint beam is located at a level higher than a level of the detector weight of the first oscillator and a level of the detector weight of the second oscillator,
the driver joint beam straddles the detector weight of the first oscillator and the detector weight of the second oscillator to directly connect the driver weight of the first oscillator with the driver weight of the second oscillator,
the detector joint beam is located at a level same as the level of the detector weight of the first oscillator and the level of the detector weight of the second oscillator, and
the detector joint beam directly connects the detector weight of the first oscillator with the detector weight of the second oscillator.

10. The oscillation angular velocity sensor according to claim 9, wherein
the driver joint beam includes a spring portion configured to expand and contract a part of the driver joint beam in an extended direction of the driver joint beam,
the detector joint beam includes:

a detector joint portion being a bent portion of the detector joint beam; and a spring portion being a part of the detector joint portion, the spring portion configured to expand and contract to move the detector weight of the first oscillator and the detector weight of the second oscillator in both an extended direction of the detector joint beam and a direction perpendicular to the extended direction of the detector joint beam.

11. The oscillation angular velocity sensor according to claim 10, wherein the detector joint portion is a U-shape portion of the detector joint beam, the detector joint portion being bent to be perpendicular to the extended direction of the detector joint beam, the spring portion of the detector joint portion is provided to each of a first portion and a second portion of the U-shaped portion, the first portion is in parallel with the extended direction of the detector joint beam, and the second portion is perpendicular to the extended direction of the detector joint beam.

12. The oscillation angular velocity sensor according to claim 10, wherein the spring portion of the driver joint beam or the detector joint beam is in at least one of a wave shape, a V-shape, and an arc-shape.

13. The oscillation angular velocity sensor according to claim 9, wherein, the detector weight has a lateral side perpendicular to the one surface of the substrate, the detector joint beam has a lateral side perpendicular to the one surface of the substrate, the lateral side of the detector weight and the lateral side of the detector joint beam have a joint portion therebetween, and the joint portion is chamfered.

14. The oscillation angular velocity sensor according to claim 9, wherein the detector joint beam includes a plurality of detector joint beam elements, and the detector weight of the first oscillator and the detector weight of the second oscillator are directly connected through the plurality of detector joint beam elements.

15. The oscillation angular velocity sensor according to claim 9, wherein the detector weight of the first oscillator is in a rectangular frame shape, the detector weight of the second oscillator is in a rectangular frame shape, the driver weight of the first oscillator is located inside of the detector weight of the first oscillator, the driver weight of the second oscillator is located inside of the detector weight of the second oscillator, the detector weight of the first oscillator and the detector weight of the second oscillator respectively have opposed portions through which the detector weight of the first oscillator and the detector weight of the second oscillator are opposed, the opposed portions respectively have openings, the driver joint beam directly connects the driver weight of the first oscillator with the driver weight of the second oscillator through the openings, and the driver joint beam is located at a level same as a level of the driver weight of the first oscillator and a level of the driver weight of the second oscillator.

16. The oscillation angular velocity sensor according to claim 9, wherein the driver weight of the first oscillator is configured to drive the detector weight of the first oscillator in a driving direction, and the driver weight of the second oscillator is configured to drive the detector weight of the second oscillator in a driving direction, so that the detector weight of the first oscillator and the detector weight of the second oscillator are in opposite phases.

* * * * *